United States Patent
Hodges

(10) Patent No.: US 8,693,358 B2
(45) Date of Patent: Apr. 8, 2014

(54) PROVIDING TOLL FREE DATA IN A WIRELESS SYSTEM

(75) Inventor: Richard Lance Hodges, Tampa, FL (US)

(73) Assignee: Syniverse Technologies, Inc., Tampa, FL (US)

( * ) Notice: Subject to any disclaimer, the term of this patent is extended or adjusted under 35 U.S.C. 154(b) by 335 days.

(21) Appl. No.: 12/970,152

(22) Filed: Dec. 16, 2010

(65) Prior Publication Data

US 2012/0155380 A1    Jun. 21, 2012

(51) Int. Cl.
*H04J 1/16* (2006.01)

(52) U.S. Cl.
USPC .......................................... 370/252; 455/406

(58) Field of Classification Search
USPC .................... 455/405–408, 414.4; 705/52, 68; 370/230–235, 252, 328
See application file for complete search history.

(56) References Cited

U.S. PATENT DOCUMENTS

| | | | |
|---|---|---|---|
| 6,839,684 | B1 | 1/2005 | Rissanen et al. |
| 2010/0005525 | A1 | 1/2010 | Fischer |
| 2012/0155380 | A1 | 6/2012 | Hodges |
| 2012/0270520 | A1* | 10/2012 | Zhou ............................. 455/406 |
| 2012/0290584 | A1 | 11/2012 | De Bona et al. |

FOREIGN PATENT DOCUMENTS

| | | | |
|---|---|---|---|
| WO | WO 2005/003993 | A1 | 1/2005 |
| WO | WO 2006/129923 | A1 | 12/2006 |

OTHER PUBLICATIONS

Sid Murlidhar, Fast and Fee Facebook Mobile Access with 0.facebook.com, May 18, 2010, 3 pages total, 0.facebook.com.
Tutorials Point, GPRS—Access Modes & Access Point Names, Retrieved Aug. 23, 2010 from Internet Site http://www.tutorialspoint.com/gprs/gprs_access_modes.htm, 2 pages total, Tutorials Point.
Tutorials Point, GPRS Architecture, Retrieved Aug. 23, 2010 from Internet Site http://www.tutorialspoint.com/gprs/gprs_architecture.htm, 2 pages total, Tutorials Point.
Tutorials Point, GPRS Protocol Stack, Retrieved Aug. 23, 2010 from Internet Site http://www.tutorialspoint.com/gprs/gprs_protocol_stack.htm, 1 page total, Tutorials Point.
Tutorials Point, GPRS—Data Routing, Retrieved Aug. 23, 2010 from Internet Site http://www.tutorialspoint.com/gprs/gprs_data_routing.htm, 2 pages total, Tutorials Point.

(Continued)

*Primary Examiner* — Dady Chery
(74) *Attorney, Agent, or Firm* — Alston & Bird LLP

(57) ABSTRACT

A wireless data-oriented service provides toll free data access to wireless users, such as GSM or CDMA-based users, when accessing specified content. The content provider pays for ("sponsors") access to specific content for wireless users, often in conjunction with advertisement campaigns. In one embodiment a separate access point name is used when making the request to distinguish between sponsored data and conventional data access requests. In another embodiment, a portal proxy is used and sponsored data is distinguished from conventional data by the address of the destination web site. Wireless users accessing the sponsored content are not billed for usage, but rather the content provider is billed for usage. A data session management platform generates appropriate call data records indicating the session usage and transmits the records to reconcile accounts between the mobile network operator and the content provider.

22 Claims, 9 Drawing Sheets

(56) References Cited

OTHER PUBLICATIONS

Tutorials Point, GPRS—PDP Context, Retrieved Aug. 23, 2010 from Internet Site http://www.tutorialspoint.com/gprs/gprs_pdp_context.htm, 2 pages total, Tutorials Points.
Wikipedia, GPRS Core Network, Retrieved Dec. 2, 2010 from Internet Site http://en.wikipedia.org/wiki/GPR_Core_Network, 6 pages total, Wikipedia.
Wikipedia, Radius, Retrieved Aug. 9, 2010 from Internet Site http://en.wikipedia.org/wiki/RADIUS, 12 pages total, Wikipedia.
Calhoun et al., Diameter Base Protocol, Retrieved Oct. 1, 2010 from Internet Site http://www.apps.ietf.org/rfc/rfc3588.html, 26 pages total, Network Working Group.
Wikipedia, Diameter (protocol), Retrieved Oct. 1, 2010 from Internet Site http://en.wikipedia.org/wiki/Diameter_(protocol), 9 pages total, Wikipedia.
DIGI, Digi Connect® Application Guide Cellular IP Connections (Uncovered), Jul. 18, 2005, 7 pages total, Digi International.
MBLOX, Sender-Pays Data, mBlox Sender-Pays Data-Zero Data Charge for Consumers, Retrieved Jan. 3, 2011 from Internet Site http://www.mblox.com/products/sender-pays-data/, 3 pages total, mBlox.
MBLOX, mBlox Sender-Pays Data, Zero Data Charge for the Consumer, Date Unknown, 2 pages total, Mblox.
MBLOX, Sender Pays Data Interface, 2010, Version 1.0, 7 pages total, Mblox.
International Searching Authority, International Search Report and Written Opinion for International Application No. PCT/US2012/023430, dated Jul. 17, 2012, 10 pages, European Patent Office, The Netherlands.
United States Patent and Trademark Office, Office Action for U.S. Appl. No. 13/360,312, Aug. 6, 2013, 16 pages, USA.
United States Patent and Trademark Office, Office Action for U.S. Appl. No. 13/360,312, Dec. 24, 2013, 19 pages, USA.

\* cited by examiner

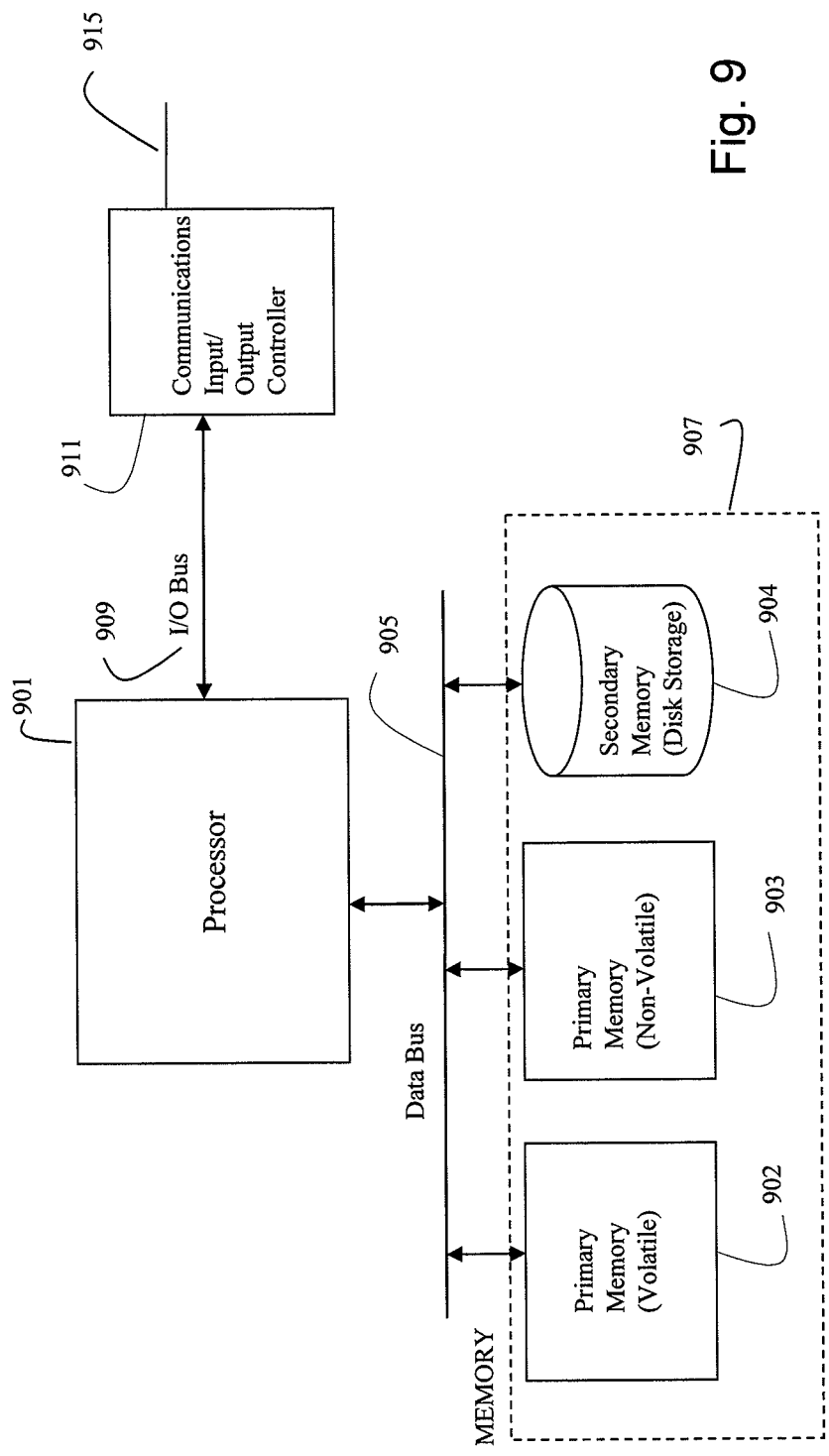

PROVIDING TOLL FREE DATA IN A WIRELESS SYSTEM

BACKGROUND OF THE INVENTION

1. Field of Invention

The present invention generally pertains to providing wireless access to a server by a mobile user wherein data charges associated with accessing the server are borne by the content provider.

2. Prior Art

The GSM system for mobile communications includes the capability of establishing not only voice traffic, but data traffic. This capability, called Generalized Packet Radio Service ("GPRS") is used to transfer data, including Internet Protocol ("IP") structured data. The data communication capability is increasingly popular with the growth of so-called "smart phones" and other wireless devices, such as tablets, that are capable of displaying text, images and rich media. Common data-oriented applications include mobile web browsing, accessing location based maps, sending photos, responding to email, Voice over IP ("VoIP"), etc. Thus, many of the common data applications used by GSM users rely on GPRS for data transfer.

Typically, GSM service providers charge a separate fee to subscribers for data service. Two common data plans are offered by wireless service providers. A minority of users have "unlimited" data plans where the monthly fees for sending/receiving data are fixed regardless of data usage. These so-called "unlimited data plans" allow transferring an unlimited amount of data to/from a mobile station each month. The other common data plan is called a "tiered," "measured service," or "metered" plan." In a tiered plan, subscribers have a tiered data pricing plan, where limited amounts of data (usually measured in megabytes) can be transferred for a fixed fee each month. Typically, there are different tiers or levels of fixed fees reflecting different levels of data transfer. Data transfer during a billing period that exceeds a limit for a given tier is then billed at the higher tier. Thus, fees increase as usage increases.

In addition to the above unlimited and metered plans, wireless users may pay for wireless data transfer service on a post-paid or pre-paid basis. A post-paid arrangement is where an invoice is sent to the user indicating an amount due for services already rendered. A pre-paid arrangement is where data usage is paid for in advance of receiving services. User's pay in advance for data usage, and their available credit may be decremented as data services are consumed. These can be pre-paid tiered plans, or pre-paid unlimited plans. Other variations are possible. For example, unlimited usage plans may be defined for a daily basis, billing period basis, or some other term.

A prepaid or tiered data service plan can serve as an incentive for a user to limit their data usage. Content providers are thus indirectly competing for users' access when the user has a limited data plan. Because users may not readily know how much data has been transferred relative to the allotted amount, users may be hesitant to use any data after a time period into their billing cycle. Thus, incidental or spontaneous mobile browsing may be limited by a subscriber's fear of exceeding their monthly tiered data plan and having to pay additional fees. One solution to avoid this disincentive is to provide a mechanism for the content provider to pay for data usage in certain cases. In essence, any data transferred by a user when accessing, for example, a specified web site, would not be considered as part of the user's monthly data volume.

This application is not unlike the development of toll-free telephone service (a.k.a. "800 service"), which was developed to encourage use of the telephone for long distance calls. At that time, phone usage was frequently billed on a measured service basis—e.g., long distance calls were charged based on time and distance. Callers were hesitant to use the phone to place orders or receive product information from businesses that were not local because long distance calls incurred additional fees. The provision of toll free telephone service encouraged people to use their telephone to call distant businesses without fear of incurring long-distance charges.

Similarly, toll free data access for mobile users can be used by businesses to encourage access to their respective business web sites and thus drive customer traffic to their web sites for reviewing products, placing orders, etc.

Thus, systems and methods are required for facilitating toll free data usage for mobile users.

BRIEF SUMMARY OF THE INVENTION

One embodiment of the invention comprises a method for providing sponsored data to a wireless user comprising the steps of receiving a request at a Data Session Management Platform ("DSMP") at an interface to a mobile network operator serving said wireless user, wherein said request is for sponsored data from a server operated by a content provider, said request comprising an identification of said sponsored data in said server, determining from said request by a processor in said DSMP a sponsored data campaign end date, determining by said processor that said sponsored data campaign end date has not occurred, generating a second request by said DSMP to said server for said sponsored data, receiving said sponsored data from said server at the DSMP, providing said sponsored data to said wireless user by the DSMP, and generating in said DSMP a usage record for charging said content provider for said sponsored data transfer.

In another embodiment of the invention comprises a system for providing sponsored data to a wireless user comprising a Data Session Management Platform ("DSMP") comprising a processor configured to: receive a request for toll free data transfer from a Gateway GPRS Support Node ("GGSN") of a mobile network operator serving said wireless user, said request identifying a server offering said sponsored data, determine from said request a toll free campaign data parameter comprising a toll free campaign end date, determine said toll free campaign end date has not yet occurred, generate a second request to said server for said sponsored data, receiving said sponsored data from said server at the DSMP, providing said sponsored data to said wireless user by the DSMP, and generating in said DSMP a usage record for charging said content provider for said sponsored data transfer, wherein said system further comprises a first interface for receiving said request at said DSMP from a GPRS support node ("GSN").

The above embodiments are only two of the various embodiments described herein, and are not intended to limit the scope of the claims herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 9 illustrates one embodiment of a data session management platform.

DETAILED DESCRIPTION OF THE INVENTION

Figure 1:
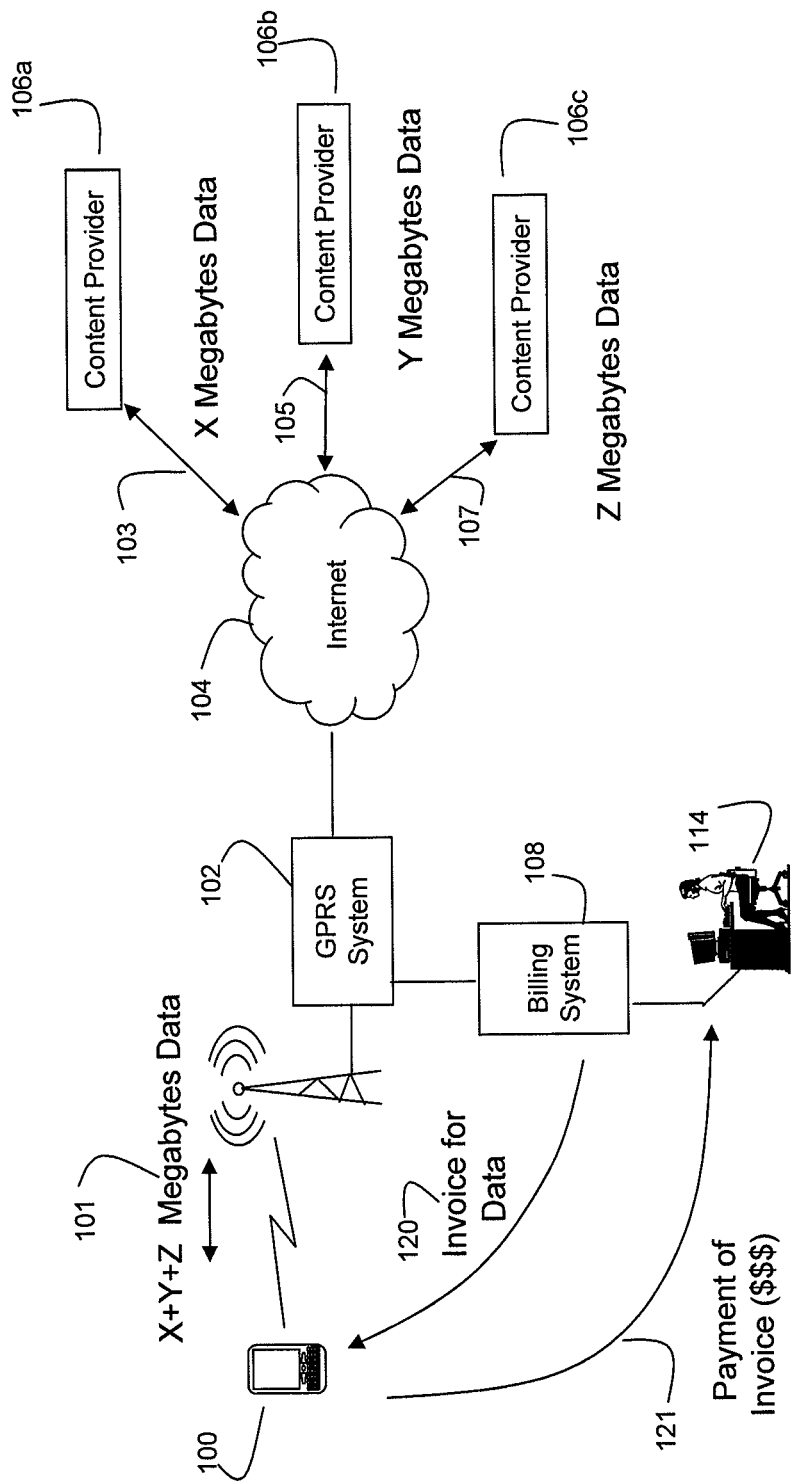
FIG. 1 illustrates one prior art approach of conventional data billing in one wireless environment.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense.

Although certain methods, apparatus, systems, and articles of manufacture have been described herein, the scope of coverage of this patent is not limited thereto. To the contrary, various embodiments encompass various apparatus, systems, and articles of manufacture fairly falling within the scope of the appended claims either literally or under the doctrine of equivalents.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product comprising a computer-readable storage medium having computer-readable program instructions embodied in the storage medium. Any suitable computer-readable storage medium may be utilized including, but not limited to: technology based on hard disks, CD-ROMs, optical storage devices, solid state storage or magnetic storage devices.

The embodiments are described below with reference to block diagrams and flowchart illustrations of methods performed using computer hardware, apparatus, systems, and computer-readable program products. It should be understood that the block diagrams and flowchart illustrations, respectively, may be implemented in part by a processor executing computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

The present invention is described herein using a GSM-based wireless architecture. However, the principles of the present invention are not limited to being used only in a GSM based wireless system, and hence can be applied to other wireless architectures, including spread-spectrum based, 4G based, UMTS, 1x/EvDO, Wi-Fi, or other wireless architectures and/or protocols. Certain embodiments may involve a combination of wireline and wireless communication. Further, the inventive concepts are not limited to wireless communication networks, but can apply to wireline embodiments, including cable, fiber and DSL based distribution technologies. The benefits of the present invention extend, and can be applied to, wireless or wireline subscribers that are on a metered or prepaid payment data plan.

Service Overview
Background of Rate Plans

GSM based wireless subscribers are typically charged a separate fee for accessing data services. In this context, data services encompass GSM Packetized Radio Services ("GPRS") based services. GPRS services typically encompass common wireless data services involving a smart phone, such as mobile web-browsing, transmission of email (sending or receiving), downloading data from a website, etc. In one common pricing structure, subscribers may pay a fixed fee for an unlimited amount of data transfer. Thus, the "unlimited" data transfer plan does not require measurement of data usage for purposes of billing the subscriber. However, a service provider may opt to measure data usage nevertheless for other reasons. Even if the user is not capped at a limit, or otherwise billed according to how much data is transferred in a billing period, there remains a need by the service provider to determine that the subscriber is authorized to use the various data services. Obviously, not all wireless users subscribe to a data plan, and attempts by such users to access a data service should result in a denial of the service.

In another pricing plan (a.k.a. "rate plan" or "pricing structure"), the subscriber is charged a fee for a defined level of data transfer. Any data transfer beyond that level in the billing period may be charged at a different (usually higher) level. This plan allows an expected level of data usage to be provided for a fixed fee, but usage above the level may be charged at the higher tier, or can be charged on a per-unit basis. This type of rating plan is referred to herein as a "capped" data plan. Other pricing structures and variations can be defined. It is not relevant for illustration of the principles of the present invention to define each of the possible tiered pricing structures, as this is simply to illustrate a motivation for providing toll free data access.

In the unlimited data rate plan, the subscriber is not motivated to limit their data usage based on tiered pricing. The subscriber is charged the same fixed fee regardless of the amount of data transferred or consumed. However, some service providers are finding that unlimited data plans are becoming less profitable. This is because, in part, because subscribers may be downloading videos that involve large amounts of data transfer, and which require significant network resources. Thus, some service providers are migrating away from offering unlimited data plans and directing subscribers towards capped or tiered data plans. Further, in many cases, subscribers opt for capped data plans because usually these are lower in cost if small amounts of data transfer occur during a billing interval. For subscribers with capped data plans, they are often sensitive to data usage, because the fees incurred when they exceed the cap can be expensive.

One service architecture in the prior art for providing GPRS data service and billing the user is shown in FIG. 1. In FIG. 1, the mobile user represented by a mobile station set 100 makes several data-oriented service requests 101 over time. These requests may involve accessing content from various content providers 106a-c. The requests are received by the GPRS System 102, which is interconnected to the Internet 104, which transmits and receives data 103, 105, 107, involving different content providers 106a-c. In this example, a total of X+Y+Z megabytes ("MB") of data are transferred at different times involving different content providers. The GPRS System 102 reports the amount of data transferred to a Billing System 108, which processes the information in accordance with the rate plan in place for that subscriber. The billing system communicates an invoice 120 (typically a printed bill that is mailed or an electronic bill that is emailed to the subscriber). In response, the subscriber returns payment 121 of the requested amount, which is processed by a service representative 114 to update the subscriber's account.

This is a simplified representation of the prior art, which does not take into account roaming and other variations, but is sufficient to illustrate how the present invention improves upon the prior art.

Sponsored Data Overview

"Sponsored data" or "toll free data" is the name of the service described herein, wherein the wireless user is not charged for certain types of data usage. The content is referred to herein as "toll free data" or "sponsored data." The source of the sponsored data, which is typically provided via accessing a web site, is referred to as the "sponsored data content provider" or simply "sponsored content provider." Other variations based on this terminology may be used.

In certain embodiments, the toll free data usage could be based on accessing data from the sponsored content provider during a certain time period or time window. In other embodiments, the toll free data pertains to transferring a certain amount of data (e.g., such as data associated with a video). For example, a wireless user could have data charges waived for accessing a given web site for the next 10 minutes after receiving notification, or for 10 minutes after initially accessing the web site. The distinction between these two examples simply involves when the time period begins. Another approach, may allow the user to view all the data provided by the web site for that particular session or subject matter. For example, an automobile manufacturer may sponsor streaming a 5 minute video comprising a commercial regarding the features of their car. The viewing of this particular video, or other videos pertaining to that particular automobile model, may occur on a toll free basis. In each of these embodiments, the user establishes a session with the content provider. This is also sometimes referred to as a "sponsored data session" or simply a "sponsored session."

The sponsored data can be various forms of hypertext transfer protocol ("HTTP") formatted data provided from a web site to a mobile device. However, the sponsored data is not limited to HTTP formatted data, and can include other formats or protocols. Specifically, the data can comprises voice, visual or video oriented data (specifically including digitized voice, JPEG, or various MPEG or similar formats). Further, the requested data does not have to be requested from a web site by a browser in a mobile device, but could be obtained from a server by an application running on a mobile device. The principles of the present invention are largely illustrated herein as obtaining HTTP formatted data from a web site using a mobile browser, but this is for purposes of illustration and not for limiting of the scope of the invention.

The sponsored data sessions can be initiated in a number of ways. In one embodiment, an SMS (instant message) is sent to a user's phone alerting them of an opportunity to access toll free or sponsored data. This can be sent out by the content provider, an advertiser, mobile network operator, or some other party. The SMS message will typically indicate a link that can be accessed by the user on a toll free basis. For example, a message sent to a user could be: "To receive a video commercial about this new product without charge, please select the following link."

In another embodiment, the content provider can include information in an advertisement for accessing a toll free data website. The advertisement could be any of the conventional forms, as well as electronic in form. Access to toll free data could be indicated via an icon associated with the ad. In one embodiment, the ad is visually oriented (e.g., a print ad), and the advertisement includes a bar-code indicated thereon. The user could use a mobile application on their mobile phone to capture an image of the bar-code, process the bar code information to identify a web site, and access the appropriate web site. Such mobile applications can be downloaded to a mobile phone or incorporated into the phone at time of manufacture.

Another embodiment involves using Near Field Communication ("NFC") techniques that can be based on limited range wireless communication technology, such as Blu-Tooth®, infrared, or RFID based technologies. The presence of the mobile phone near a particular product could be determined by a NFC technique, and used to trigger sending information to the wireless user indicating the ability to access sponsored data. Of course, the wireless user could also use a browser or other application downloaded to the mobile phone for accessing a sponsored web site. Thus, in one embodiment, the wireless user may be physically located near a product which "advertises" its presence. Upon taking action to access the sponsored data, the wireless user has the ability to obtain further information about the product on a toll free data access basis.

The user may receive as part of the notification, or when initially accessing data from a web site, information indicating that the data requested is sponsored data and that no charge will be incurred for accessing the data. An indication may be provided to the user regarding limitations in accessing the data, such as the toll free aspect is available for a specified time window, time duration, or for an amount of data that is accessed. The content provider may provide a notification or warning indication when the user is about to exceed the terms of use, or is about to be charged for further usage. For example, information on the web site could indicate that the time period for toll free access is about to expire, or that the usage levels for sponsored data are about to be exceeded. The notification could inform the user that continued use will be billed at the subscriber's regular rate. Similarly, if the user requests to leave the sponsored data content provider (e.g., to access another web site), an indication may be provided to the user indicating that toll free data access will no longer be provided.

Campaign Management

Provisioning of sponsored data is typically associated with an advertisement campaign. Similarly, sponsored data is associated with its own sponsored data campaign (or simply a "campaign"). Unless stated otherwise, "campaign" refers to the sponsored data campaign, while "advertisement campaign" refers to promotion of goods and/or services. Typically, the advertising campaign and sponsored data campaign are coordinated. A sponsored data campaign broadly refers to the set of information required to provide toll free data. In addition, the sponsor will typically contract with a third party, where the third party arranges (or otherwise is responsible for ensuring) that the data usage fees associated with the sponsored data transfer are waived or suppressed. The third party could be an advertiser, a wireless service provider, or an entity providing wireless data billing services to the wireless service provider. Ultimately, the third party must coordinate with the entity providing wireless billing processing for the wireless network operator. For example, the third party could coordinate the content provider with the mobile network provider to ensure that sponsored data is provided for the duration of an advertisement campaign. In some embodiments, the third party is the same entity that provides bill processing for the mobile network operator or the mobile network operator itself.

An advertising campaign typically has a duration, e.g., a starting date and an ending date. Similarly, a sponsored data campaign is also associated with a time period during which toll free data is provided. The area of service where toll free data may be accessed may be limited as well. Thus, coordination between the content provider and billing processor of the mobile network operator is desirable.

The campaign for providing toll free data typically requires the content provider to pay for (e.g., "sponsor") the data transfer on behalf of the wireless user. Hence, the content provider may also be referred to as the "sponsor." The content provider is often the same entity as the toll free sponsor, but in many cases the entity coordinating and arranging the provision of toll free data at a high level may not be the same entity actually providing the content (sponsored data) at an operational level. For purposes herein, the content provider and the sponsor are considered to be the same, but it is noted that these can be separate. The sponsor may contract with a third party to actually generate the information, load it into a server, and operate the server. Thus, the content sponsor will typically agree to a pricing structure associated with providing the sponsored data. This can be based on a flat fee per subscriber accessing the content, a rate for per time period of use ($0.10 per minute of use), a rate for the amount of data transferred, or some other arrangement. In addition, the content provider could be billed for establishment of the campaign, providing reports of usage, reconciliation of payments, etc.

Toll Free Data Architecture

Figure 2:
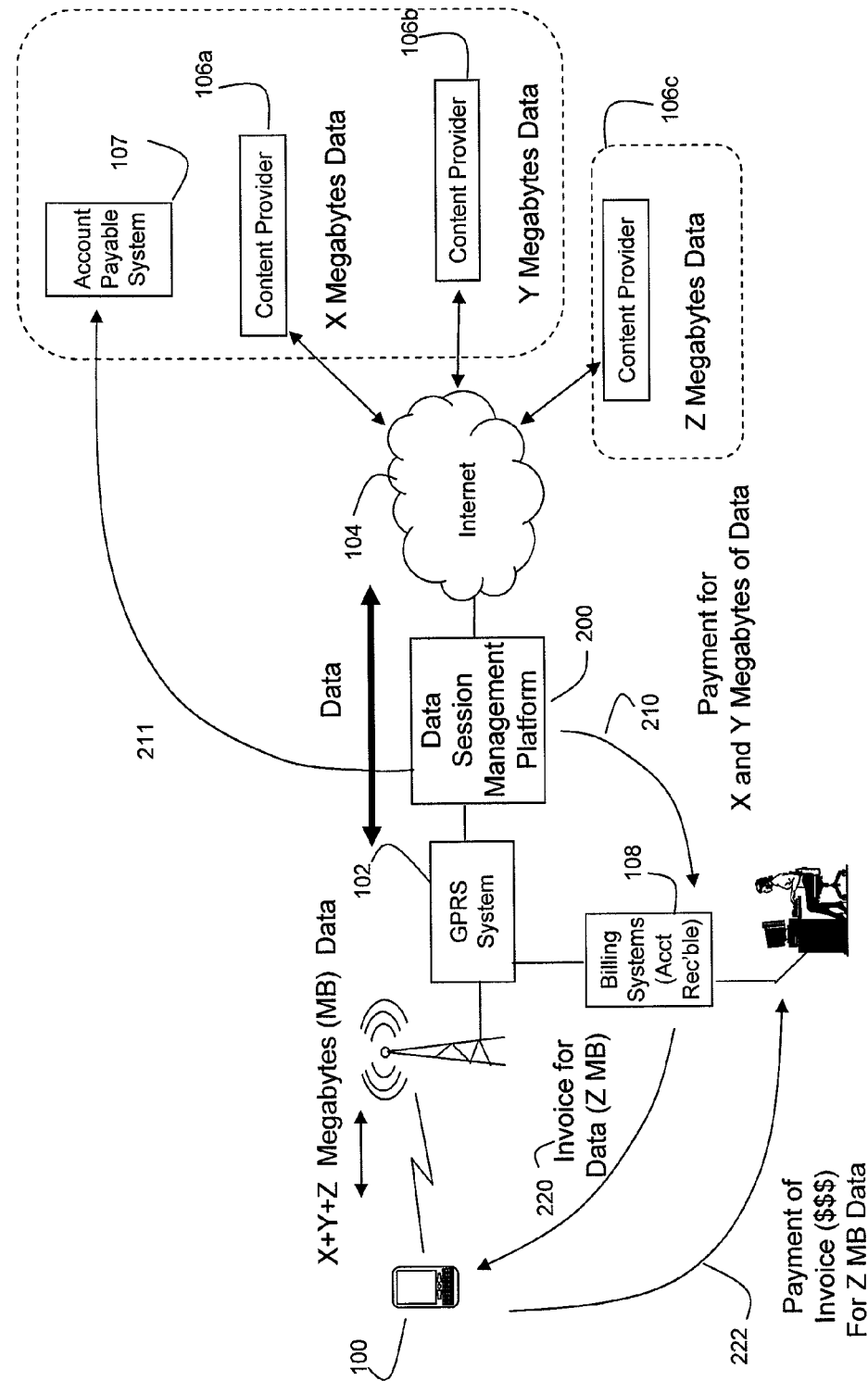
FIG. 2 illustrates one embodiment of providing sponsored data.

FIG. 2 illustrates one architecture of an embodiment of the present invention, which for purposes of illustration focuses on an embodiment based on GSM wireless service. In FIG. 2, the mobile station set 100 can initiate various service requests at different or simultaneous times resulting in transferring a total of (X+Y+Z) megabytes of data. In this embodiment, all data passes through the GPRS system 102 and sponsored data will also pass through the Data Session Management Platform ("DSMP"), so that the total sponsored data transferred and/or the duration of a sponsored data session is readily ascertainable by the DSMP. As it will be seen, in other embodiments, the non-sponsored data may bypass the DSMP (or transparently pass through the DSMP). In this embodiment, the GPRS forwards the data to DSMP 200, which in turn is connected to the Internet 104. The requests and associated data sessions from the user are shown as going to three content providers 106a-c through the DSMP, with each content provider respectively providing X, Y, and Z megabytes of data. In this embodiment, content providers 106a and 106b each are referred to as "sponsored content providers," or similar such terms. Content provider Z is a conventional content provider—e.g., data transferred from content provider Z is billed at the subscriber's prevailing rate plan. In contrast, sponsored data that the sponsored content providers provide is exempt, so-to-speak, from impacting the subscriber's data usage. Specifically, the service provider does not bill the subscriber for the sponsored data transfer, and thus, the amount of sponsored data is not used in computing the billable data used by the subscriber.

The DSMP tracks data usage associated with sponsored content provider 106a and 106b for each wireless user or session. It typically also manages campaign data, such as the beginning and ending dates of the campaign with respect to user requests, facilitates billing, may manage access control based on various parameters to the content provider, and in some embodiments, the DSMP may employ a proxy server function. In the embodiment in FIG. 2, the DSMP receives all sponsored data and thus is able to readily ascertain sponsored data usage. The DSMP 200 then coordinates (or otherwise facilitates or arranges) payment for the sponsored data usage incurred for the subscriber. The DSMP 200 may inform 210 the billing system 108 of the mobile network operator as well as the account payable system 107 of the sponsored content provider as appropriate. This can be done in real time, on a monthly basis, or according to some other schedule. The information includes the metrics used to measure the sponsored data (e.g., time, data transferred, etc.). Thus, both the content provider (who is paying for the sponsored data) and the mobile network operator (who is receiving the payment) are made aware of the respective sponsored data usage, and thus the corresponding financial amount, involved for the sponsored data service. The information typically includes at least an identifier of the subscriber in some form, when the data was transferred, and the amount of data involved. In other embodiments, aggregate data can be provided on a periodic basis. Other indications, such as currency involved, settlement date, etc. can be indicated.

One skilled in the art will recognize that the functionality performed by the DSMP can be integrated with the GPRS (specifically, the GGSN, as it will be seen). Other configurations are possible, including incorporating all or some of the functionality of the DSMP in the billing system. For example, in FIG. 2, all the data is shown as passing through the DSMP 200. In other embodiments, (see, e.g., FIG. 3), the non-sponsored data does not pass through the DSMP.

The function of ensuring that the subscriber's invoice does not reflect sponsored data usage can be viewed as a separate function from processing data for billing the content provider for the respective sponsored data usage. However, these functions are typically performed in a coordinated manner. Specifically, ensuring that the subscriber does not pay for sponsored data usage is typically associated with ensuring that the mobile network operator is compensated by the sponsored content provider. In one embodiment, the amount of the reduction in the invoice to a subscriber could be equal to the amount charged and received from the sponsored data content provider. In other embodiments, the content provider may be providing sponsored data at a wholesale rate, so that the per-usage rate is lower compared to the subscriber's usage rate.

Typically, the content provider will be paying for numerous sessions initiated by a number of wireless users during a campaign period. Hence, a rating arrangement for the content provider is likely to reflect a discount for larger data usage. In one embodiment, the content provider is billed at a rate that is independent of the subscriber's rate plan. The content provider may be billed a flat fee per user session attempt, tiered usage rates based on volume, a fixed fee for the campaign, etc. Other variations for rating the sponsored data usage can be developed by one skilled in the art. The sponsored content provided can be billed once during a campaign, or periodically during a campaign.

Figure 3:
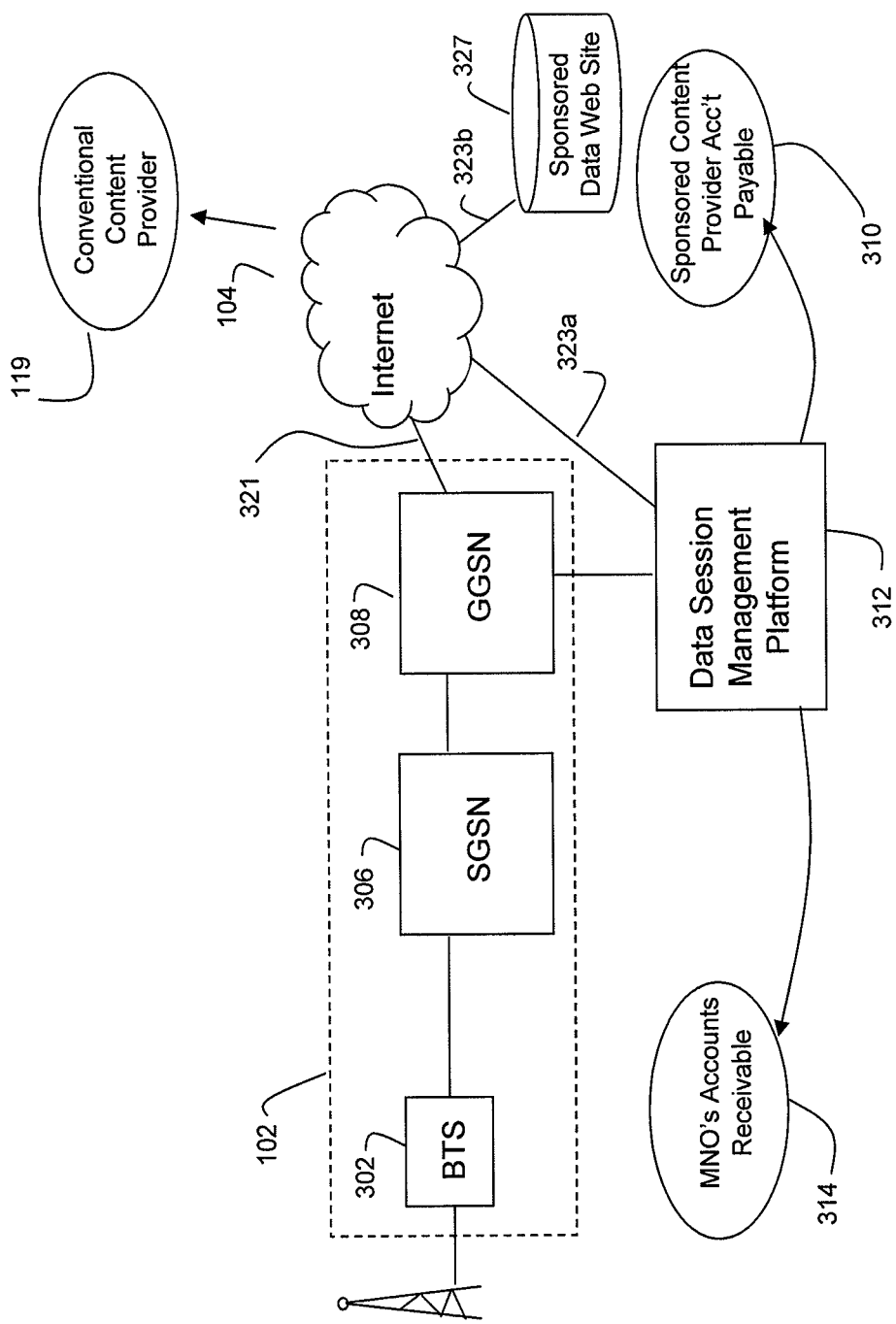
FIG. 3 illustrates further details for one architectural embodiment for providing sponsored data.

The function of processing data usage for the purpose of invoicing the sponsored content provider and/or arranging compensation to the mobile network operator is illustrated in FIG. 3. In this embodiment, the GPRS infrastructure 102 is shown as comprising a base station 302 which is connected to a Serving GPRS Support Node ("SGSN") and a Gateway GPRS Support Node ("GGSN"). The SGSN authenticates the mobile station, performs the mobility management, maintains registration information of mobile stations and routes data packets to the correct GGSN for subsequent access to the external interface. The SGSN also performs charging functions. Specifically, the SGSN itself does not render an invoice or bill the subscriber, but obtains information which is used as the basis for charging the subscriber. The GGSN acts as an interface and a router to external networks, such as the Internet, and also collects usage information associated with the use of external data transfer.

In one embodiment, which is shown in FIG. 3, the GGSN determines whether a user request is associated with sponsored data or a conventional data, and may route the information accordingly. For example, in FIG. 3, the GGSN 308 may route conventional (e.g., non-sponsored) data over facility 321 to the Internet 104, which connects to a conventional content provider 119. However, if the request is for sponsored data, the GGSN 308 may route the data to the DSMP, which then routes the data over facility 323*a* through the Internet 104, over facility 323*b* to the sponsored data web site 327.

The DSMP 312 collects information regarding how much data was transmitted and received from a sponsored content provider, and provides this information to the appropriate entities to facilitate settlement. In this embodiment, the appropriate entities involve the Mobile Network Operator's accounts receivable 314 which is informed of the aggregate amount of sponsored data transferred during a billing period. The DSMP provides corresponding usage information to the sponsored content providers account payable system 310. Thus, the content provider is informed as to how much usage occurred for data provided to users of the mobile network operator, and the mobile network operator is also informed.

In another embodiment, the GGSN 308 can route sponsored data directed to the sponsored content provider and then inform the DSMP of how much data was transferred. However, it is generally easier for the DSMP to directly handle the data traffic and determine how much data was transferred There are different mechanisms that can be used to distinguish conventional (non-sponsored) data from sponsored data. This distinction can be done by the mobile network operator, by incorporating different types of information. Thus, multiple embodiments are possible for implementing toll free data or sponsored data in a GSM network.

One embodiment involves using different Access Point Name ("APN") values to distinguish between sponsored and non-sponsored data. In this embodiment, the SGSN of the mobile network operator receives a request for data involving a particular APN value, and the SGSN then uses the APN to select one of several GGSNs. Conceptually, different APN values can be mapped to the same or different GGSNs. In one embodiment, for an APN value associated with sponsored data, the request is routed to a logically or physically dedicated GGSN that only handles sponsored data. The GGSN, in turn, routes the sponsored data to the DSMP.

The APN is essentially a data string representing an address that is resolved by a domain name server into a numerical address that provides routing information for the SGSN and GGSN. The APN consists of two parts: the Network ID which identifies the external service requested by the subscriber, and the Operator ID which specifies routing information. The APN is used to determine a private address that is the IP address of the GGSN involved in providing the sponsored data connection. In some networks, different APN values can be used to identify physically different GGSNs implementing the sponsored and non-sponsored data services. In other embodiments, the different APN values are used to route to a specified single physical GGSN, where the APN value identifies a logical or virtual GGSN implemented within the single device. In this embodiment of FIG. 3, the GGSN 308 is configured so that it does not bill the wireless user for the session data (sponsored data), but would bill for conventional data sent to a conventional content provider 119.

The APN approach can be used in a GPRS system. The system does not have to be GSM, but could be a 4G or CDMA based system, or even a wireline system provided it incorporates an APN.

Another embodiment is to use a portal proxy. In this approach, the web site identifier (e.g., URI or Uniform Resource Identifier) is used to distinguish between web sites that provide sponsored data versus non-sponsored data. Specifically, all sponsored data web sites are "behind" a proxy server, which is in the DSMP, so that the DSMP controls access to the sponsored content sites. The functionality of the portal proxy can be combined with other functional processing for ensuring the content provider is properly billed. The portal proxy approach can be applied to a number of architectures which use web site identifiers, and can be readily applied to other data communication architectures, including CDMA wireless data, wireline DOCSIS, etc.

Access Point Name Approach

Figure 4:
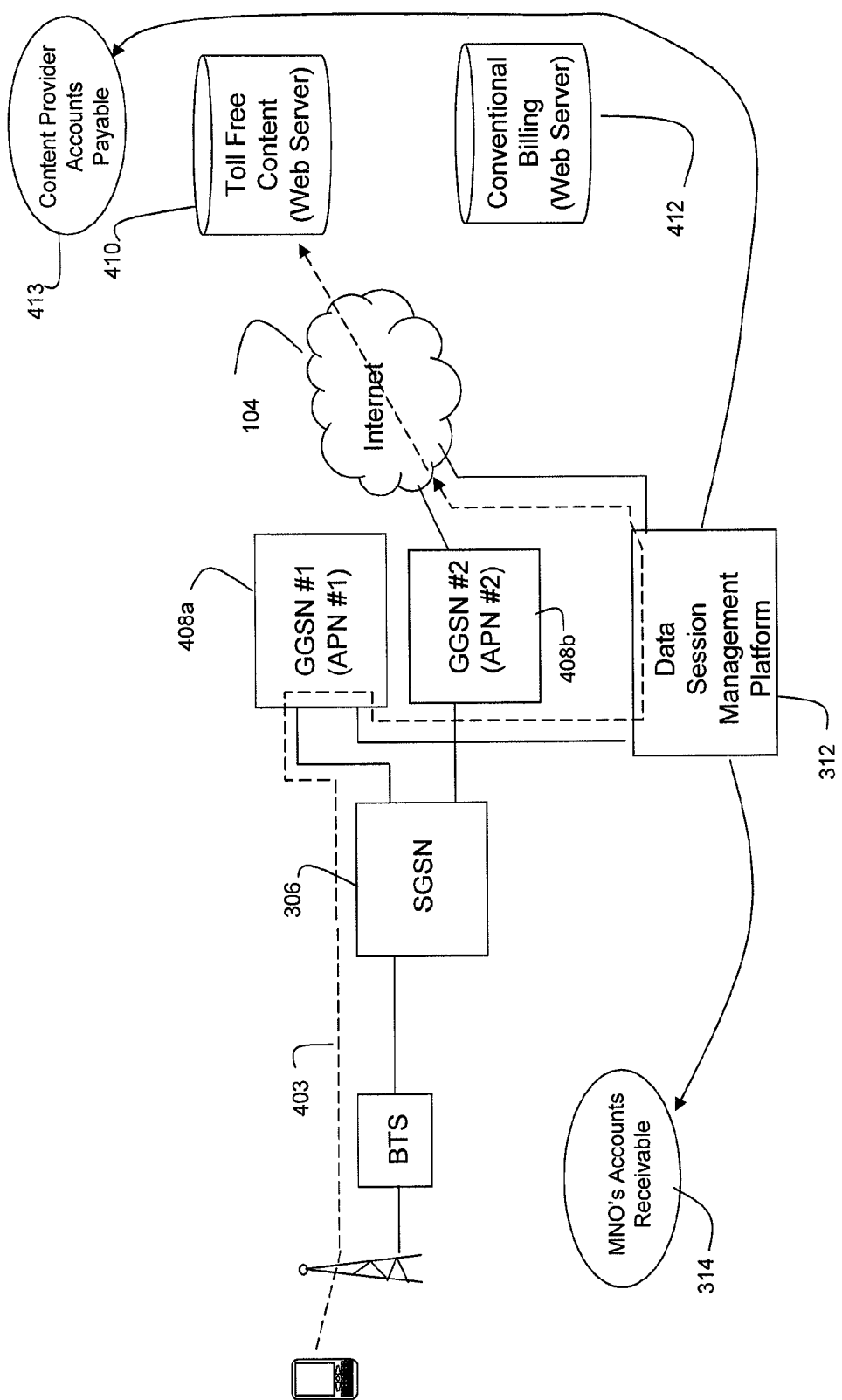
FIG. 4 illustrates one architecture embodiment for providing sponsored data in a GSM environment using multiple access point names.

One embodiment for using different APNs to identify different GGSNs is illustrated in FIG. 4. This embodiment uses different physical GGSNs for purposes of illustration, with GGSN #1 shown as being used for toll free data, and GGSN #2 being used for conventional (non-sponsored) data. However, the different GGSNs could simply be different logical entities in a single GGSN. In this case, GGSN #1 408*a* is associated with a first APN value (shown here as APN #1). Once the GGSN is identified, the GGSN examines an APN user name in the received message (which may be, in one embodiment, a "Create PDP Context Request" message). In FIG. 4, the APN user name (APN#1), which is associated with a particular toll free content provider, is processed by the identified GGSN (GGSN #1). Other APN user names may be processed for other toll free content providers. A second GGSN #2 408*b* is associated with a second APN value, shown as APN #2 for simplicity. GGSN #2 is used for conventional data traffic and processes APN user names associated with conventional traffic. The SGSN is responsible for interacting with the appropriate GGSN, by selecting the appropriate GGSN based on the corresponding APN value. In actual embodiments, the APN value could be structured such as, e.g., APN=Advertisername.mno123.mcc123.gprs.

The determination of which APN is used (and hence which GGSN is used) is determined by the initial request from the mobile station set. In one embodiment, one of several browsers could be selected by a user. Thus, a particular toll free browser could be used by a user to initiate the request. An example can illustrate how this can occur. A browser or mobile application, is identified to the user as being associated with a particular retailer, referred to as "Retailer." The user downloads the Retailer's browser into their mobile phone. When the user is shopping in the retailer's store, the user selects the Retailer mobile application used to provide toll free data access to selected sites. This browser could be limited to certain toll free sites (e.g., hosted by the Retailer at its web-servers) or could be used to access any toll free sites recognized by the operator. A generic toll free application could be developed, or a business specific application could be defined.

GGSN#2 can be considered as the regular, normal GGSN used for conventional data transfer (a corresponding dotted line for conventional session data usage is not shown in FIG. 4). Usage of GGSN#2 results in the session data usage charged to a user's account in a conventional manner. However, when GGSN#1 is used, the APN is indicative that the data is sponsored data and conventional billing does not occur. Thus, GGSN#1 is configured to avoid billing the user for data sessions received using the toll free APN value. While two distinct GGSNs are shown, these could easily be integrated into one GGSN.

Returning back to the case where a sponsored data request is made, the request is sent via the BTS to the SGSN 306. The SGSN performs various prerequisite functions as are known in the art. The SGSN then examines the APN address and routes the request to the appropriate GGSN. Specifically, sponsored data is routed to the sponsored data GGSN#1 408a, which then arranges establishment of a data session with the content provider. In this illustration, the GPRS Tunneling Protocol 403 ("GTP") is established between the SGSN and GGSN #1. The dotted line 403 illustrates the originating and terminating locations of the data transferred. GGSN #1 is configured to measure the data transferred for each particular subscriber, but it does not charge each subscriber for the data transfer. In this embodiment, the GGSN #1 is further configured to provide usage information to the DSMP (but not the session data itself), which processes the usage data so that the toll free content provider is charged accordingly. Thus, in some embodiments the GGSN#1 can be implemented by modifying a conventional GGSN thereby providing the Data Session Management Platform of FIG. 2. However, these are shown as two separate entities for purposes of illustration in FIG. 4. In another embodiment, the GGSN #1 may direct the data of the data session itself to the DSMP, which in turn routes it using the Internet. In this case, the data usage can be determined by the DSMP as opposed to the GGSN.

As noted, traffic directed to APN #2 is processed by GGSN #2 and is used to access data that is conventionally billed. Thus, different APN values are used to distinguish which GGSN handles the data, and thus determines whether the data transferred is conventional data (e.g., included in the subscriber's data usage plan) or whether it is sponsored content data (e.g., it is exempted from the subscriber's usage plan). The SSGN 306 queries a domain name server to resolve the APN as to which GGSN should receive the request and data.

In the embodiment shown in FIG. 4, once the GGSN establishes the data session, the GGSN then informs the DSMP 312 in FIG. 4 of the usage data. The DSMP processes the data to generate the appropriate records, which may then transmit to the mobile network operator's ("MNO's") account receivable systems 314 and the content provider's account payable systems 413. Alternatively, the DSMP provides only reports to the MNO and the content provider (and/or sponsor). The accounts payable/receivable systems are systems operated by (or on behalf of) the mobile network operator and content provider, and which track usage and/or the amounts due. The DSMP can provide reports to each entity indicating data session usage (on a detailed or aggregate basis), or can provide a detailed invoice/amount due that indicates a dollar amount as well as the data session usage information.

Figure 5:
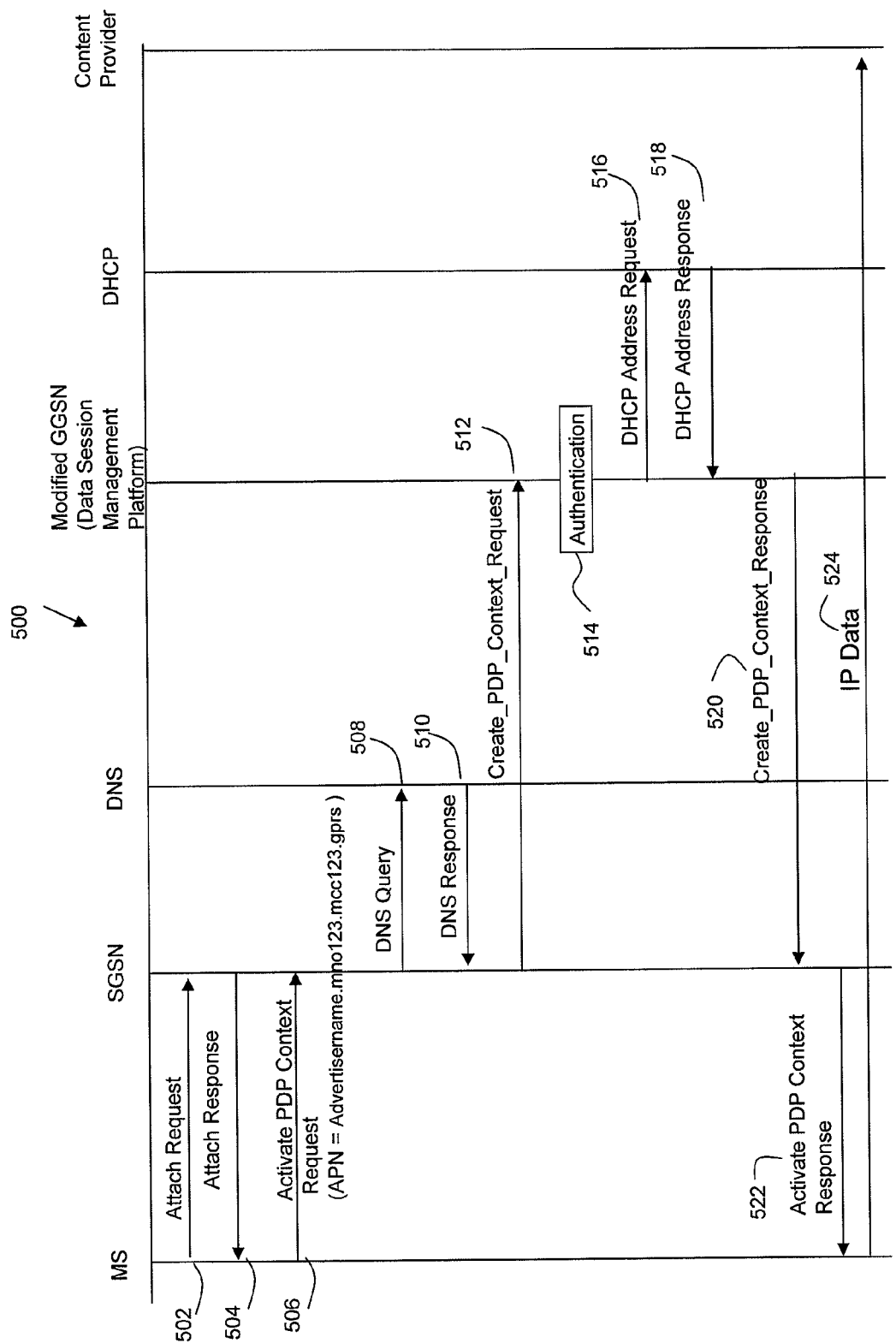
FIG. 5 illustrates one messaging diagram for providing sponsored data in a GSM environment using multiple access point names.

FIG. 5 illustrates a line diagram 500 involving some of the system components illustrated in FIG. 4 for accomplishing sponsored data access. In FIG. 5, the mobile station ("MS") transmits an "Attach Request" message 502 to the SGSN for initiating data service. The SGSN responds with an "Attach Response" message 504 accepting the request. The MS then is in a position to request establishment of the Packet Data Protocol ("PDP") context by sending an "Activate PDP Context Request" message 506. The establishment of the PDP context requests establishment of a GTP tunnel with the remote GGSN. The request includes the APN value, which in this case is presumed to be associated with toll free data. The APN value has to be included in the request from the mobile station and may include a programmed username and password value (not shown in FIG. 5). This can be used to ensure authorized access to the content. The mobile station would also typically include an identifier, such as its MSISDN or international mobile subscriber identifier ("IMSI") value.

The SGSN in step 508 initiates a "DNS Query" to a domain name server to resolve the IP address of the GGSN associated with the APN, and after the "DNS Response" 510 is received, the SGSN then initiates a "Create_PDP_Context_Request" message 512. This request is made to the GGSN associated with the APN value. The GGSN may authentic the user, such as using the well known RADIUS procedures, which are well known in the art. After completion, a "DHCP Address Request" message 516 and "DHCP Address Response" message 518 are sent. The GGSN can then confirm the creation of the PDP context in the "Create_PDP_Context_Response" 520, which results in the "Activate PDP Context Response" 522. At this point, the Mobile Station is able to transfer IP data in step 524 with the sponsored content provider.

The GGSN illustrated in the embodiment of FIG. 4 is a modified version of a conventional GGSN. While some of the functions performed by the DSMP (e.g., the modified conventional GGSN) are similar in scope to a GGSN, additional functions are performed by the DSMP to implement the sponsored data service. One difference is that the DSMP does not report data usage for determining a wireless user's data usage for billing in a conventional manner. Specifically, data usage is reported by the DSMP for billing the content provider, not the wireless user. A conventional GGSN creates records, sometimes called "call detail records" ("CDRs") that records information about a call, or more accurately in this case, a data session. The CDR typically indicates how much data has been transferred between the originating and terminating entities. However, as noted the DSMP processes usage data for generating a bill or usage report to the content provider. These records can be in the form of a CDR. Further, the DSMP may incorporate financial and settlement functions for settling payment with the content provider. In other embodiments, the DSMP may send usage data to a separate system for performing this function.

As noted previously, in other embodiments the DSMP 312 functionality of FIG. 4 may be incorporated into the GGSN#1 408a, so that these functions are implemented in a single physical entity.

Portal Proxy Approach

A second approach for accomplishing access to sponsored data involves using a proxy server to handle requests from the mobile user. This approach is based on the mobile device requesting sponsored data which involves using a proxy server that is functionally present in the DSMP. In one embodiment, a specially configured mobile application in the handset is used to formulate the sponsored data request to the DSMP. Based on the indicated web site request generated by the mobile device (as opposed to an APN value), the request is processed by the GPRS system of the mobile operator. For non-GSM based systems, other corresponding elements may be involved. If the request is for accessing a web site of a sponsored content provider, the GPRS system then routes the request to the DSMP and the GPRS system avoids billing the user's account for data usage. Next, a proxy server function in the DSMP determines the sponsored content provider and routes the request accordingly. If the request is for accessing a conventional, non-sponsored web site, then GPRS will instead forward the request to the Internet, and on to the conventional content provider's web site. In the case of conventional, non-sponsored data, existing billing procedures can be incorporated.

Figure 6:
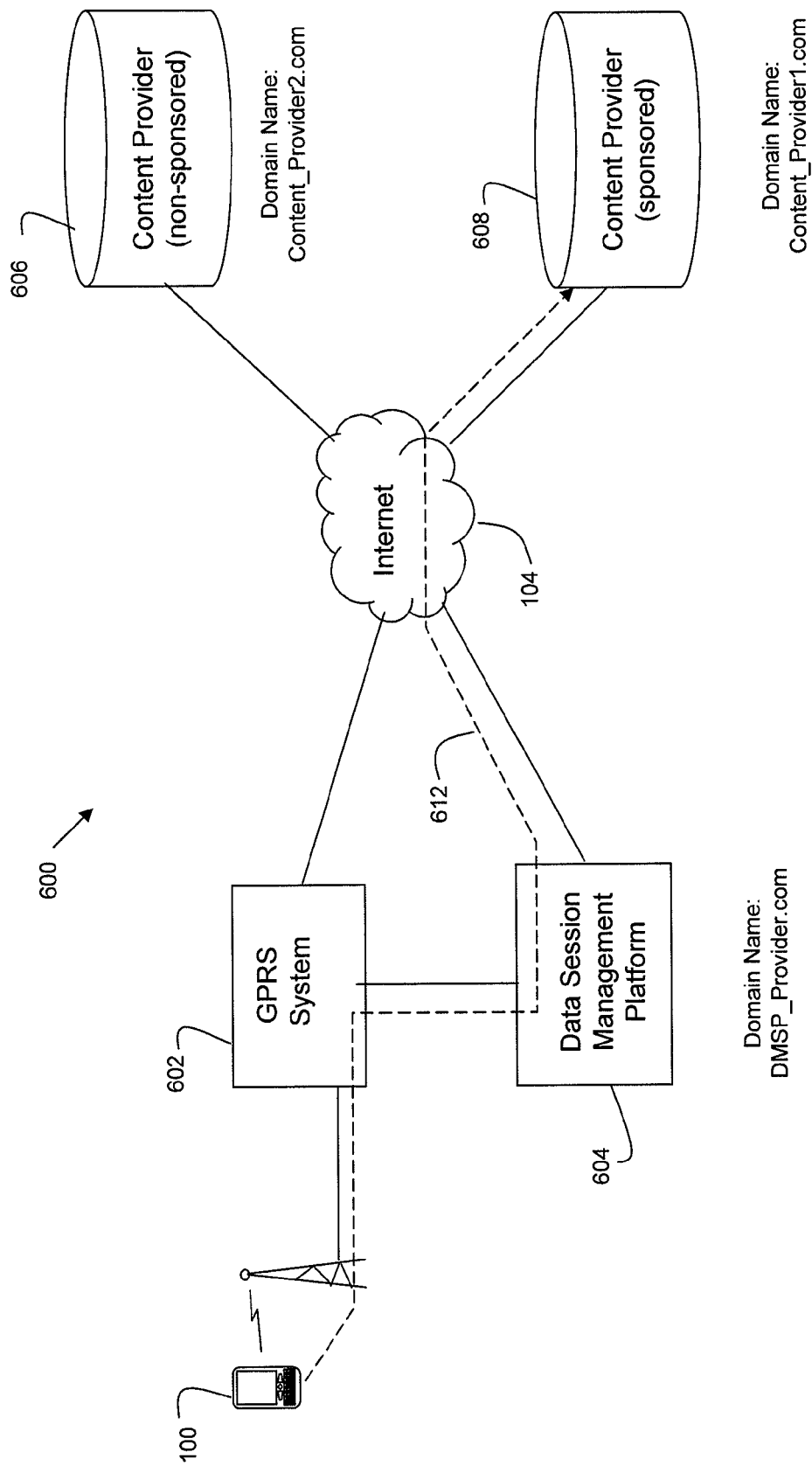
FIG. 6 illustrates one embodiment of providing sponsored data using a portal proxy approach.

One embodiment of the architecture and message flow is shown in FIG. 6. It is useful to compare how conventional (non-sponsored) message flow is processed compared to sponsored data. The mobile user 100 initiates a request which is processed by the GPRS system 602. If the request is for a conventional content provider, the GPRS system is configured to analyze the requested URI, and if the URI is associated with a conventional content provider, the GPRS then forwards the request over a facility to the Internet 104, which in turn routes the request to the content provider 606. The GPRS also bills for data usage in a conventional manner. Typically, such usage is billed by the mobile network operator consistent with the user's rate plan. If, however, the GPRS determines that the destination is a sponsored content provider based on resolving the domain name identified in the request, the GPRS 602 forwards the request to the DSMP 604. In this case, the GRPS is configured to not bill the user.

The DSMP 604, in turn receives the request from the GPRS system, and initiates various procedures for recording usage aspects (if not already initiated for that session), and resolves the address of the destination domain name, which is the address of the particular sponsored content provider. The path of the data request is shown by the dotted line 612 of FIG. 6 which originates with the mobile user, is routed to the GPRS system, on to the DSMP, then to the Internet, and finally to the content provider. Response data from the content provider would occur in the reverse direction.

The aforementioned request messages can be formatted as a GET message. For a sponsored data request, the request could be formatted as follows: GET:/Content_Provider1.com/index.html. In this embodiment, the parameter "Content_Provider1.com" is the domain name of the sponsored content provider 608. This domain name is resolved by a proxy server function in the DSMP. Prior to this, the GPRS system resolves the domain name DSMP_name.com to identify the DSMP. If the non-sponsored content provider 606 was intended to be addressed, then e.g., "content_provider2.com" would have been indicated in the original GET message. Further, the domain name "DSMP_name.com" would not be present. Obviously, there can be a plurality of sponsored and non-sponsored providers associated with a corresponding plurality of domain names, but only one of each is shown in FIG. 6.

In the GET message, the domain name DSMP_name.com is used by the GRPS system to identify the DSMP, which in this embodiment is used to route sponsored traffic requests to the DSMP. Thus, in this embodiment, the GPRS is the point at which non-sponsored data is segregated from sponsored data.

Once the DSMP receives the request, the DSMP 604 records information related to the session, such as the length of the data session or the amount of data transferred from the sponsor's site. The DSMP typically also performs various other functions associated with toll free data requests, such as checking the status of the toll free campaign with respect to the request. The DSMP is aware of all data passing through it and is aware of how long or how much data was transferred. The connectivity between the DSMP and content provider can be provided in different ways, including through a virtual private network connection to the appropriate content provider. Similarly, the connectivity between the GPRS and the DSMP can occur in different ways. In this embodiment, the DSMP appears to the mobile network operator as an IP address within the mobile network operator's GRX or IPX network. In other embodiments, the DSMP may be an IP addressable element outside the mobile network operator's network connected via private facilities, or the Internet. In other embodiments, the DSMP may be integrated within the GPRS system, or a stand-alone system as is shown in FIG. 6.

Processing of Session Establishment Rules

The DSMP is involved when a sponsored data session is initiated. In certain circumstances, a request for a sponsored data session may originate from a user where the request is incompatible with the campaign rules established for that sponsored content provider. For example, the availability of sponsored data may be associated with an advertising campaign having specified starting/ending dates. The availability of sponsored data may be advertised to a wireless user by placing a placard near a product in a retail store indicating that "free" data transfer is available for the time period. If the store personnel do not timely remove the placard after the ending date of the campaign, wireless users may nevertheless attempt to access the sponsored content provider. Alternatively, the advertising campaign may involve printed ads, and the wireless user obtains an obsolete copy of the printed ad and attempts to access the web site after the campaign has ended. For whatever reason, users may attempt to initiate a sponsored data session after the sponsored data campaign has ended and in such cases, the user should not be able to access the data on a toll free basis and the content provider should not be billed. Thus, the DSMP may perform various rule-checking procedures associated with the request. Performance of this function is facilitated by the embodiments where the data session is routed through the DSMP. The DSMP can act as a "gatekeeper" to ensure that only valid toll free data sessions are established through it.

Checking the campaign rules can limit access to the content provider based on date, time, originating mobile network provider, MSISDN of the wireless user, or other parameters available to the DSMP when the request is made for a toll free session. The DSMP is aware of the time of the request and can compare this with the campaign limits established for that content provider. The DSMP may also be aware of the particular wireless user (via MSISDN, if provided) and can perform various other types of rule checking For example, a wireless user reporting a stolen phone or an account which has been compromised can have the account identified via MSISDN. At the beginning of each session, the DSMP could check whether the MSISDN is authorized or is indicated on a "black list" (or "negative list") of prohibited users. Alternatively, a user abusing the sponsored content service could be barred from accessing content of a specific content provider, or otherwise barred entirely from accessing any sponsored data content provider.

In other embodiments, a "positive list" of users authorized to access the sponsored data can be created. It is possible to define a list of authorized users for a particular content provider. For example, the list could be defined by the content provider as including the content provider's employees, customers, premium customers, etc. In other instances, the sponsored data may be accessed only by one of: pre-paid wireless users, post-paid wireless users, post-paid customers in good standing and having a certain service level with the service provider or having a certain demographic, etc.

The sponsor may also desire to limit access to sponsored content by defining various sponsor defined limitations. Typically, the content provider will indicate a beginning and ending date of the campaign, but there may also be other limitations defined, including a maximum number of accesses or "hits" to the sponsored content, a limit on the total number of bytes of data transferred, minutes of use, a total monetary liability for sponsored data access, etc. Those skilled in the art will recognize that various types of authorization and security processing can occur prior to allowing the wireless user access to the sponsored data content.

If access by a wireless user is denied, an appropriate notification message can be sent to the wireless user. This message can be initiated by the DSMP (if the DSMP is involved with establishment of the session) or the DSMP can notify an appropriate component in the mobile network operator (e.g., the SSGN or GGSN). In other embodiments, the content provider could initiate this message. Further, if any one of the access limitations is reached during an active session, the system can notify the user of such conditions. For example, if a time limit has been exceeded for a sponsored content session, the user may be informed of such condition. Information could be displayed on the mobile station indicating that continuing access to the data will be charged at the prevailing rates to the wireless user as defined by the service provider. Similarly, if the user migrates away (e.g., accesses a different web site) from a sponsored content provider, a notification may be sent informing the user that conventional data plan rates will be applied. Typically, the notification is sent to the user from the DSMP.

Usage Data Clearing Process Flow

The usage data clearing process flow refers processing usage data for purposes of reconciling the accounts associated with a user accessing sponsored content. Proper reconciliation of accounts include: 1) suppressing the billing of the wireless user for accessing the sponsored data, and 2) processing data so that the sponsor is properly billed and/or other parties properly reimbursed. The suppression of billing a wireless user occurs simply by not generating the call detail records that are normally used to bill the wireless user. Thus, this is characterized by the absence of processing specific to a user's account. Those skilled in the art will recognize that in various embodiments, various mechanisms can be used to avoid the generation of the wireless users' call detail record or billing record. For example, in one embodiment the GGSN handling the sponsored data is programmed to not bill the user; in other embodiments, the GGSN could generate usage records which are then deleted or otherwise ignored.

Figure 7:
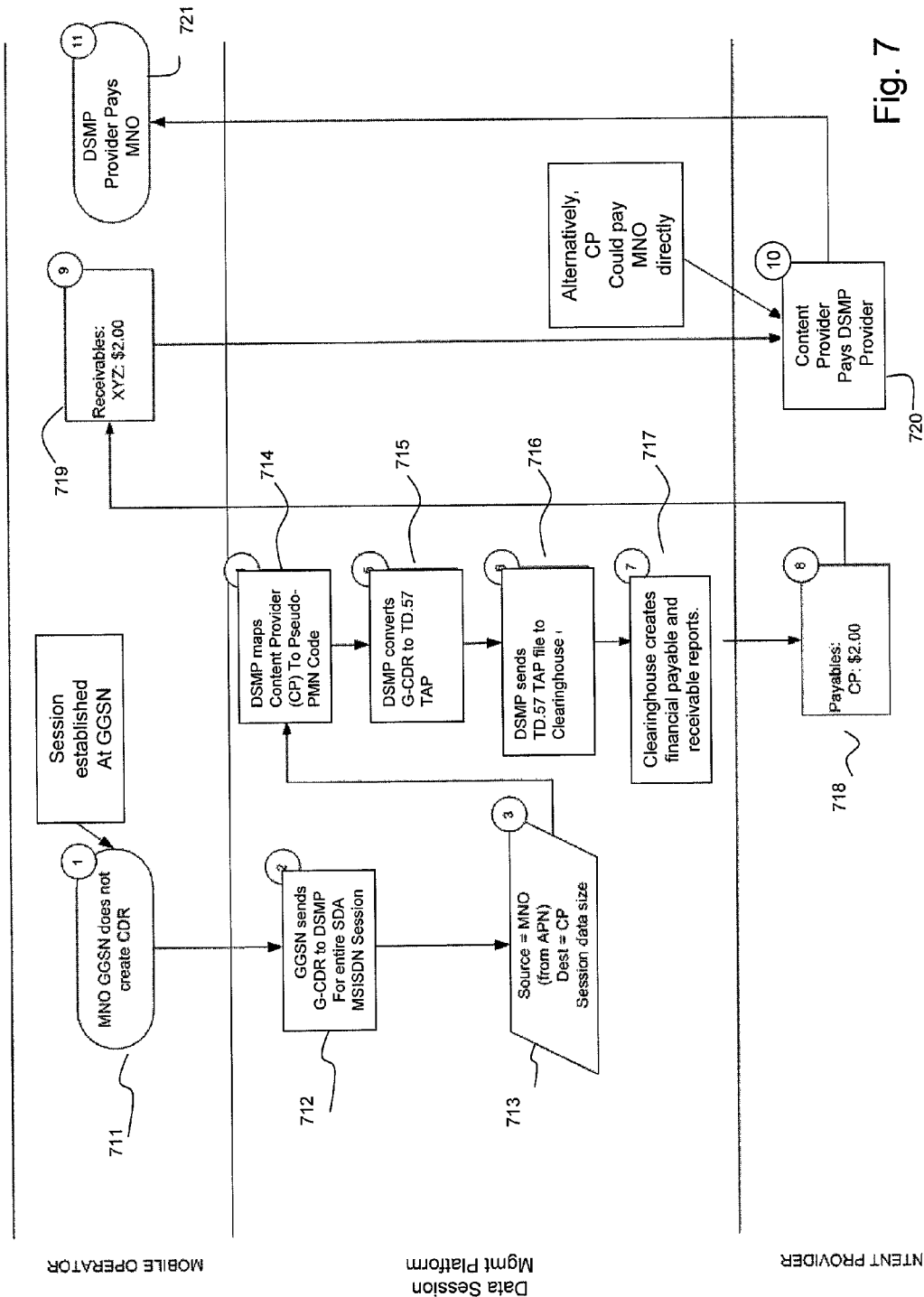
FIG. 7 illustrates one processing flow for providing sponsored data financial settlement reports using multiple access point names.

For the APN approach, the processing in the DSMP is shown in FIG. 7. Recall that in the APN approach, the SGSN creates a GTP tunnel directly with the modified GGSN (the DSMP), therefore bypassing the conventional GGSN normally used. Since the conventional GGSN is bypassed, no billing records are generated for the wireless user. Instead, the DSMP generates records directed to inform the content provider and/or mobile operator of the data usage. In some embodiments, the usage data is combined with an amount due to create a bill for the content provider.

In FIG. 7, the process begins in step 711 with the establishment of the sponsored data session. In this case, the conventional GGSN is bypassed and the mobile operator does not generate a conventional Call Detail Record ("CDR") for the wireless user.

In the next step, step 712, the modified GGSN (which functions in this embodiment as the DSMP), generates a modified GGSN CDR ("G-CDR"), which reflects the sponsored data session initiated by the wireless user, as identified by the MSISDN (mobile station telephone number). (In other embodiments, the DSMP may generate the CDR record.) Step 713 shows that the CDR record reflects the mobile network operator as the source (which can be derived from various sources, including the APN, username, and/or password in the initial request) and also notes the destination content provider. The size of the session, which can be measured in time, data, or other parameter, is also noted. The CDR records may be created at the beginning of a session and are usually completed at the end of the session.

The DSMP in step 714 looks up an identifier associated with the content provider ("content provider identifier"). This could be a pseudo Private Mobile Network code (PMN) associated with the content provider or another type of identifier, such as an identifier allocated by Transferred Account Data Interchange Group ("TADIG"). In one embodiment, in step 715, the record format is converted from a CDR format to a Transferred Account Procedure ("TAP") formatted record or some other formatted record (e.g., a Cellular Inter-carrier Billing Exchange Record or "CIBER"). A number of standard based formats can be used, and in one embodiment, a GSM standard referred to as Temporary Document 57 ("TD 57") can be used. This is also known as "TAP 3," which is a billing format used by roaming service providers for transmitting billing records to the home network operator. In other embodiments, proprietary or non-standardized formats could be used for conveying billing information. In further embodiments, the usage reports can be sent without converting them into another format. In step 716, the DSMP sends a TAP file to a clearinghouse, which is a third party entity for reconciling data and/or financial records. In step 717, the clearinghouse receives the file and creates the appropriate accounts receivable and payable reports.

Upon receiving the report, the content provider in step 718 is in a position to know how much to pay for the sponsored data (shown here as an amount due of $2.00). Similarly, in step 719, the mobile operator reflects a corresponding amount in its accounts receivable that is due. In one embodiment, the content provider in step 720 periodically pays the DSMP provider, and the DSMP provider then pays the mobile network operator in step 721. As noted, there are alternative embodiments, such as where the content provider could pay the mobile network operator directly, bypassing the DSMP. In such embodiments, the records from the DSMP may still be used to reconcile the amounts due. In other embodiments, a different third party may be involved.

Figure 8:
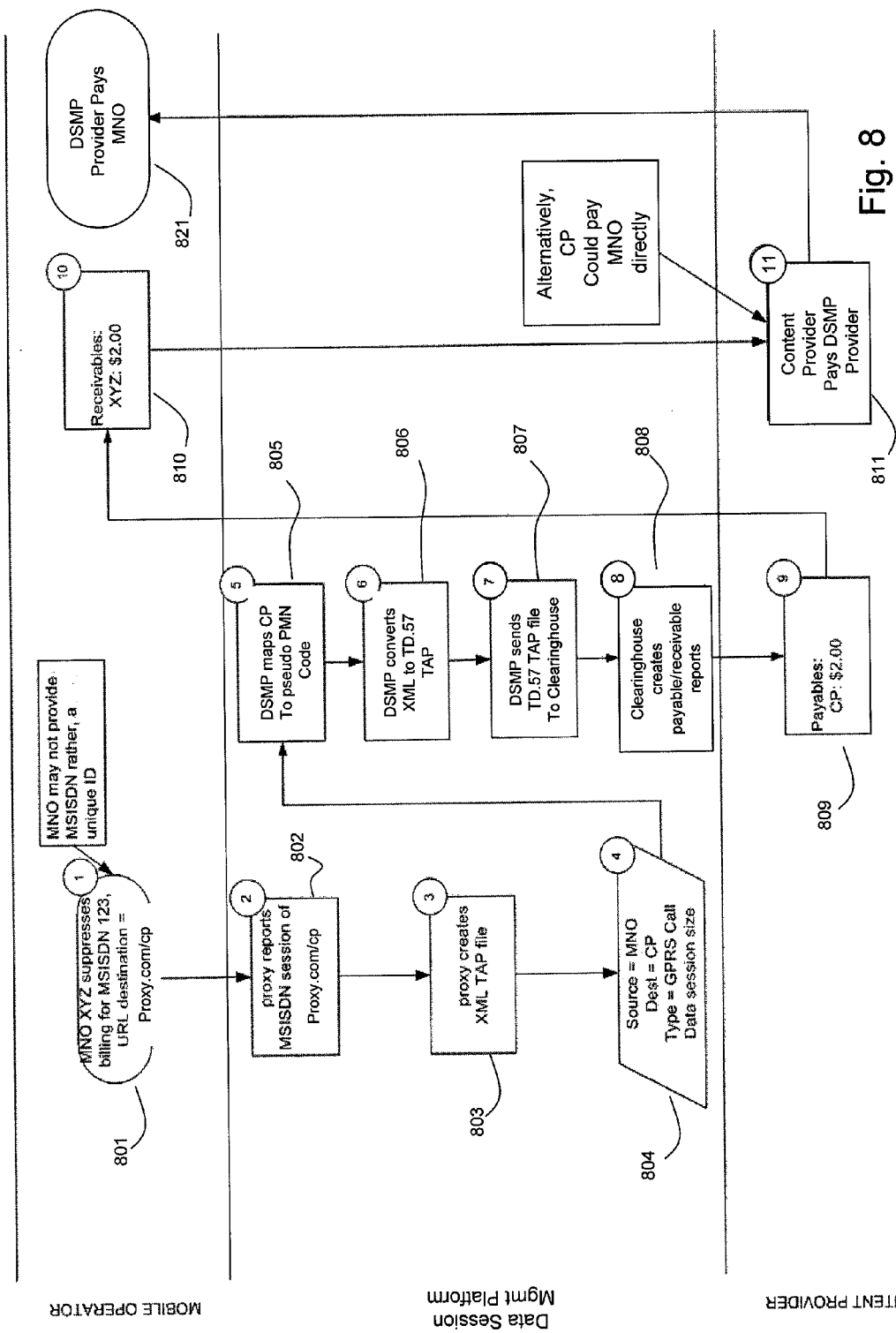
FIG. 8 illustrates another processing flow for providing sponsored data financial settlement reports using a portal proxy approach.

FIG. 8 shows a similar process that may be used if the portal proxy approach is used. Recall that in the portal proxy approach, the domain name is indicative of whether sponsored data processing is applicable or not. Consequently, in step 801, if the mobile operator receives a request indicating a URI with a sponsored content destination (e.g., an address indicating "proxy.com/cp") then the mobile operator suppresses conventional billing for data to/from the domain, e.g., "proxy.com." The mobile operator passes the request including the MSISDN (mobile telephone number) to the DSMP. In other embodiments, the mobile network operator may provide a unique ID for the end-user, as opposed to a MSISDN value.

In step 802, the DSMP (which may be integrated or in communication with the proxy server) notes the creation of a sponsored data session involving the end user. The DSMP may record the volume of data, the duration, a combination thereof, or other aspects of the session for purposes of generating usage data used to charge the content provider. The DSMP in step 803 then creates a record of the session in an XML TAP file format. The record is formatted in step 804 such that the source is identified as the mobile network operator indicating the request from step 801. The destination is set as the content provider ("CP") who is sponsoring the data, and other parameters are recorded, such as the type of call ("GPRS") and session size (time or data volume).

In step 805, the DSMP determines an identifier, such as the pseudo Private Mobile Network ("PMN") code associated with the content provider. Typically, a look-up table in the memory of the DSMP maintains an association of the content provider and a pseudo PMN assigned to that content provider. The pseudo PMN code was assigned previously, during the contractual establishment of the sponsored data campaign. The pseudo PMN code allows the DSMP to treat the content provider similar as a PMN provider for data clearing purposes. However, the content provider need not actually have, or provide, a private mobile network. As noted previously, a TADIG code or other sponsor identifier may be used in lieu of a pseudo PMN code.

In step 806, the DSMP may convert the call detail record to a GSM standard based TD.57 compliant TAP record. Not all embodiments require reformatting the usage record information into another format. In other embodiments, the function of converting usage information into another format, which can be a standardized or non-standardized format, may be carried out by a separate system from the DSMP. In step 807, this TAP record is then transmitted using conventional communication facilities to an appropriate clearinghouse system ("CHS"). The records can be sent in real time as they are generated, at the end of each day, monthly, or according to some other periodic basis. In step 808 the clearinghouse (which may be integrated with the DSMP system) creates financial reports that form the basis for payable amount and the corresponding receivable amount based on the records generated.

For example, in step 809, information regarding the amount due is provided to the content provider such that the content provider records an amount payable in their systems (the amount shown here, for purposes of illustration, as $2.00). Corresponding information is provided to the mobile operator reflecting that a receivable of $2.00 is due from the content provider.

In this embodiment, in steps 811 and 821, the content provider pays, directly or indirectly, the mobile operator. At this point, there are a number of billing and settlement arrangements that are possible. For example, in this embodiment, the DSMP acts to settle the financial amount between the content provider and the mobile operator. In other embodiments, the content provider and mobile operator may reconcile directly with each other, based on reports from the DSMP. For example, the mobile operator could invoice the content provider based on the DSMP usage reports. In other embodiments, a third party clearinghouse may be involved in settling the transaction. Regardless of the arrangement, the DSMP is the entity that generates the data from which reconciliation is based. It is possible that the content provider may further record aspects associated with the session so that verification of the DSMP values is possible.

In various embodiments, various records and/or files can be transmitted to the mobile network operator and/or the content provider at the initiation of the DSMP or the clearinghouse. This can be analogized to a "push" data transfer. However, in other embodiments, the content provider and/or mobile network operator can "pull" the data. For example, the MNO can determine when the data will be requested. This can be accomplished by the DSMP or clearinghouse making the appropriate data usage information available at a web site or portal, which is then accessed by the content provider and/or MNO at its convenience. Various well known techniques known in the art for requesting or transferring the usage information can be used.

One embodiment of the DSMP system described previously is shown in FIG. 9. In FIG. 9, the DSMP system comprises a processor 901. The processor interfaces via an input/output bus 909 to an I/O controller 911. The I/O controller may interface with other system components via interface 915 as required. The other components that DSMP system may interface may include the SGSN or GGSN of the mobile operator, content provider, accounting systems, etc. The processor also communicates via a data bus 905 with a memory system 907, which comprises various forms of computer readable media, including primary memory 902, such as RAM, forms of permanent primary memory such as ROM, FLASH memory, etc. 903, and secondary storage, such as disk storage 904. Other variations and types of memory storage technology can be used. The memory typically stores the programming steps which when executed by the processor causes the system to perform the processing previously described. In other embodiments, different processing configurations and arrangements can be used, including distributed processing, parallel processing, client-server type arrangements, specialized purpose processors programmed accordingly, etc. The system shown in FIG. 9 could also be embodied as a general purpose computer programmed to perform the steps to accomplish the invention. Those skilled in the art will recognize that the principles of the present invention can be applied in a number of ways.

The above illustrates several embodiments of the toll free service and associated architecture. Variations in the architecture, messaging, and procedures are possible and one skilled in the art could use the information presented herein to develop other embodiments not described herein.

The invention claimed is:

1. A method for providing sponsored data to a wireless user comprising:
    receiving a request at an apparatus via an interface to a mobile network operator serving said wireless user, wherein said request is for said sponsored data from a server operated by a content provider, said request comprising an identification of said sponsored data in said server;
    determining from said request by a processor in said apparatus a sponsored data campaign end date;
    determining by said processor that said sponsored data campaign end date has not occurred;
    generating a second request by said apparatus to said server for said sponsored data;
    receiving said sponsored data from said server at the apparatus;
    providing said sponsored data to said wireless user by the apparatus; and generating in said apparatus a usage record for charging said content provider for providing said sponsored data.

2. The method of claim 1 wherein said request comprises a Global System for Mobile Communications (GSM) based Access Point Name (APN) indicating a Gateway GSM Packetized Radio Services (GPRS) Support Node (GGSN) of said mobile network operator connected to said interface of said apparatus.

3. The method of claim 2 wherein said usage record indicates a wireless user identifier associated with said wireless user, a mobile network operator identifier associated with said mobile network operator, and at least one of either a time duration of said sponsored data transfer or a volume of said sponsored data transfer.

4. The method of claim 3 wherein said usage record further comprise a monetary amount associated with said sponsored data provided to said wireless user, and said processor of said apparatus is configured to transfer said usage record to said content provider.

5. The method of claim 4 wherein said processor of said apparatus is configured to:
determine a content provider identifier associated with said content provider from a table stored in memory of said apparatus; and
indicate said content provider identifier in said usage record.

6. The method of claim 3 wherein said processor of said apparatus is configured to transfer said usage record to said mobile network operator.

7. The method of claim 1 wherein said request comprises a Uniform Resource Identifier (URI) and said processor is configured to determine from said URI said sponsored data campaign end date.

8. The method of claim 7 wherein said usage record indicates a wireless user identifier associated with said wireless user, a mobile network operator identifier associated with said mobile network operator, and at least one of either a time duration of said sponsored data transfer or a volume of said sponsored data transfer.

9. The method of claim 8 wherein said usage record further comprising a monetary amount associated with said sponsored data provided to said wireless user and said processor is configured to transmit said usage record to said content provider.

10. The method of claim 9 wherein said apparatus comprises a Data Session Management Platform (DSMP) and said processor is configured to transmit said usage record to said mobile network operator.

11. An apparatus for providing sponsored data to a wireless user comprising a processor configured to:
receive, via an interface, a request for toll free data transfer from a mobile network operator serving said wireless user, said request identifying a server offering said sponsored data,
determine from said request a toll free campaign data parameter comprising a toll free campaign end date,
determine said toll free campaign end date has not yet occurred,
generate a second request to said server for said sponsored data,
receive said sponsored data from said server at the apparatus,
provide said sponsored data to said wireless user by the apparatus; and
generate in said apparatus a usage record for charging said content provider for providing said sponsored data.

12. The apparatus of claim 11 further comprising:
a memory storing said usage record; and
wherein said processor is further configured to transmit said usage record to said mobile network operator.

13. The apparatus of claim 12 wherein said usage record comprises a wireless user identifier associated with said wireless user, a mobile network operator identifier associated with said mobile network operator, and either a time duration of said sponsored data transfer or a volume of said sponsored data transfer, and a monetary amount associated with said sponsored data provided to said wireless user.

14. The apparatus of claim 13 wherein said request comprises a Global System for Mobile Communications (GSM) based Access Point Name (APN) and said processor is further configured to:
determine said toll free campaign data parameter comprising said toll free campaign end date using said APN to ascertain said toll free campaign data parameter from a plurality of toll free campaign data parameters.

15. The apparatus of claim 13 wherein said request comprises a Uniform Resource Identifier (URI) and said processor is further configured to:
determine said toll free campaign data parameter comprising said toll free campaign end date using said URI to ascertain said toll free campaign data parameter from a plurality of toll free campaign data parameters.

16. The apparatus of claim 13 wherein said usage record further comprises a content provider identifier associated with said request, and said processor is configured to transmit said usage record to said content provider.

17. The apparatus of claim 13 wherein said processor is configured to reformat said usage record prior to transmitting said usage record to said mobile network operator.

18. The apparatus of claim 11 further comprising:
a memory storing a plurality of usage records in a file, wherein each record is associated with said content provider and a respective one of a plurality of wireless users.

19. The apparatus of claim 18 wherein said apparatus comprises a Data Session Management Platform (DSMP) and said processor is configured to transfer said plurality of usage records to said mobile network operator and said content provider.

20. A method of denying transfer of data requested for transfer by a wireless user, comprising:
receiving a request from a mobile network operator at an apparatus, said request originating from a wireless user requesting transfer of data between a mobile phone and a sponsored content provider, wherein said apparatus interfaces with said mobile network operator serving said mobile phone, wherein said request comprises data used by said apparatus to identify said sponsored content provider;
retrieving by a processor of said apparatus a set of sponsored data campaign parameters associated with said request stored in a memory of said apparatus, wherein said set of sponsored data campaign parameters comprises a campaign end date for transfer of said sponsored data from said sponsored content provider;
determining said end date has occurred;
not forwarding said request to said sponsored content provider;
generating a message to said wireless user indicating said sponsored data is unavailable; and
generating a record stored in said memory of said apparatus reflecting receipt of said request.

21. The method of claim 20 wherein said request comprises a Global System for Mobile Communications (GSM) based Access Point Name (APN) username, and wherein said processor is configured to retrieve said set of sponsored data campaign parameters using said APN username.

22. The method of claim 20 wherein said request comprises a Uniform Resource Identifier (URI), and wherein said processor is configured to retrieve said set of sponsored data campaign parameters using an Access Point Name (APN) username.

\* \* \* \* \*